Sept. 18, 1962 E. L. VON ROSENBERG 3,054,647
DRILL PIPE COUPLING
Filed Dec. 2, 1959
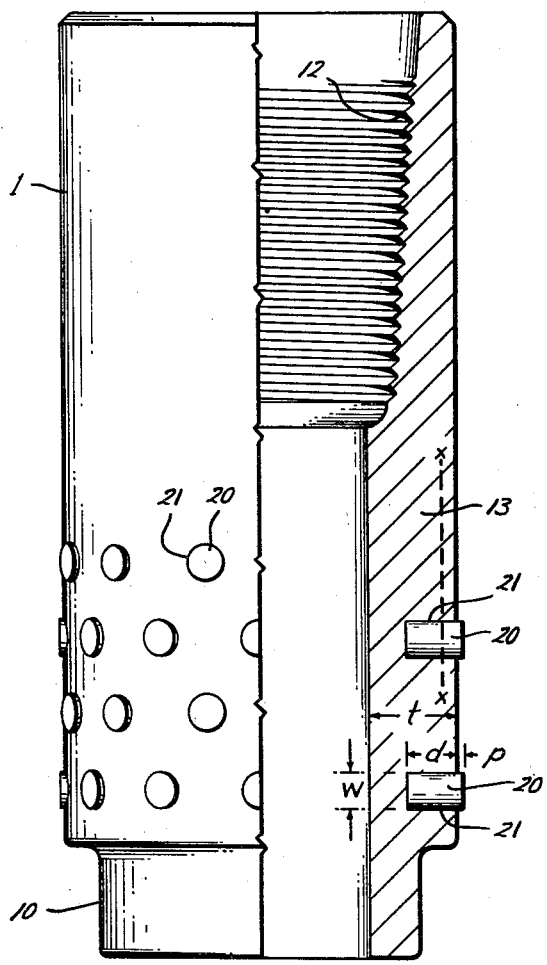
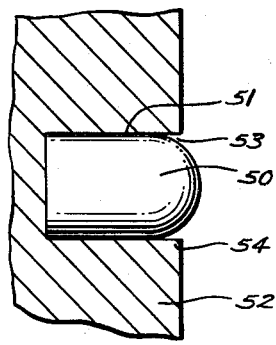
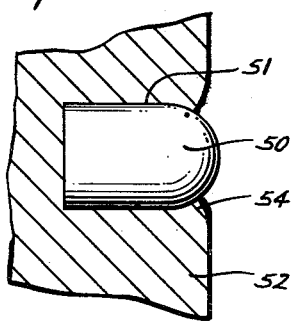
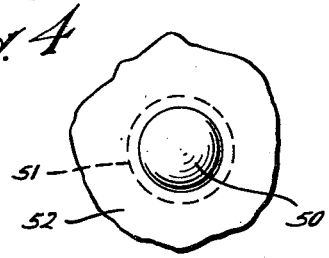
Edgar L. Von Rosenberg
INVENTOR.
BY Murray Robinson
ATTORNEY

United States Patent Office 3,054,647
Patented Sept. 18, 1962

3,054,647
DRILL PIPE COUPLING
Edgar L. Von Rosenberg, Oklahoma City, Okla., assignor to American Iron & Machine Works Company, Inc., Oklahoma City, Okla., a corporation of Delaware
Filed Dec. 2, 1959, Ser. No. 856,767
2 Claims. (Cl. 308—4)

This application is a continuation in part of application Serial No. 787,717, filed January 19, 1959, now abandoned.

This invention pertains to drill pipe couplings. As here used the term drill pipe coupling is intended to cover tool joints, drill collar connectors, drill collars, and any other part integral with or rigidly connected with the drill pipe so as to rotate with the pipe about the pipe axis and of sufficient diameter to contact the well wall and thus be subjected to the abrasive effect of sliding motion relative to the well wall.

The object of this invention is to provide such a drill pipe coupling that has a longer life than any heretofore known.

Heretofore, in an effort to prolong the life of drill pipe couplings, it has been proposed to coat the surface thereof with a layer of tungsten carbide formed in one or more annular bands around the circumference of the coupling. The tungsten carbide is welded in place. Such a construction is subject to tearing loose. Once a portion of a ring has broken away from the base metal, added stresses are applied to the remainder which quickly peel it off the coupling. Due to the fact that the material is merely a coating it cannot be very thick and hence wears off quickly even if it does not tear, break, or peel off.

According to the invention, a plurality of elongated tungsten carbide pellets are separately embedded in the drill pipe coupling whereby loss of one pellet will have no effect on the others. Further in accordance with the invention, each pellet is disposed with its axis perpendicular to the coupling axis and is of a length substantially greater than its maximum width or transverse dimension, e.g., diameter in the case of cylindrical pellet, and its outer end is either flush with the outer surface of the coupling or not substantially protuberant therebeyond, e.g., in the case of a cylindrical pellet the pellet does not protrude a distance over ten percent of the diameter of the pellet. This construction prevents the pellets from being kicked out of their sockets by forces transverse to the axis thereof. The length of the pellets is preferably such as to extend far enough radially into the coupling so that the length-width ratio is still greater than unity even when the coupling has worn down close to the replacement point. Mechanical retention of each pellet in its socket is provided by an interference fit or, according to one modification, working the metal around the pellet after insertion.

Other features, objects, and advantages of the invention will appear from the following detailed description of a preferred embodiment thereof, reference being made to the accompanying drawings wherein:

FIGURE 1 is a full scale half section of a tool joint box embodying the invention;

FIGURE 2 is an enlarged fragmentary sectional view showing an assembly stage of a modified form of the invention;

FIGURE 3 is a view similar to FIGURE 2 showing the final state of assembly of the FIGURE 2 form of the invention; and FIGURE 4 is a fragmentary exterior view of the modification shown in FIGURE 3.

As shown in FIGURE 1, the tool joint is a tubular member adapted to be flash welded at one end 10 to a length of drill pipe and provided at the other end 11 with an internal thread 12 adapted for connection to the pin end of a similar tool joint. The end 10 is of drill pipe inner and outer diameters and is of considerably less thickness than the thickness of the body 13 of the tool joint. Since the body extends radially outward beyond the exterior surface of the drill pipe, it is subject to the most wear as the pipe is rotated in the well bore and the surface of the tool joint slides over the surface of the well bore. It is the body of the tool joint, therefore, that is most in need of protection against wear.

According to the invention, a plurality of tungsten carbide pellets 20 are disposed in sockets 21 spaced apart around the periphery of the body of the tool joint. Preferably the pellets are uniformly spaced in staggered annular rings as shown. The depth "$d$" of each socket is about fifty percent greater than the transverse with "$w$" of each socket and the inserts bottomed in the sockets protrude from the sockets no more than a distance "$p$" equal to ten percent of the width "$w$." The depth of each socket is equal to about fifty percent of the thickness "$t$" of the body of the tool joint. The spacing between inserts preferably exceeds the depths of the sockets. The lengths of the sockets are perpendicular to the axis of the drill pipe.

With the construction described not only is the tool joint strength maintained but the tungsten carbide pellets are prevented from being torn out of their sockets as the drill string rotates and the pellets are subjected to shear stresses by contact with the well wall. In this connection it is to be remembered that tool joints, drill collars, drill collar connectors, in fact all drill pipe couplings as herein described, are subject not only to shearing stresses at their surfaces as they move relative to the well wall, but to tension or compression depending on their location in the drill string, to sudden and continuous torques and to repetitively reversing bending moments. The latter may tend to open up a socket and pop out its pellet. The extra length of the pellets helps prevent this type of failure. However in the event of loss of a pellet it is necessary that the remainder of the tool joint have sufficient strength to prevent imposition of crushing loads on pellets in sockets adjacent the empty one and to avoid failures of the tool joint due to stress concentrations around the empty socket, so that the sockets must be adequately spaced apart.

Although pellets of any cross-section may be used, preferably cylindrical pellets are used which are shot into the sockets. This mode of insertion is rapid and well adapted to the materials, since any irregularities on the surface of the hard pellet will become interlocked with the more resilient steel of the tool joint. The pellet sockets preferably are drilled into the outer surface of the tool joint. The inserts may be either cast tungsten carbide ground to size, or sintered tungsten carbide, which is also usually ground to size and therefore may be described as separately preformed, that is, formed separately from the remainder of the tool joints and before their insertion in the tool joint sockets. The diameter of each pellet is preferably slightly larger than its socket prior to insertion therein when both are at the same temperature and unstressed. Instead of gun insertion, shrink or press fitting may be used or the pellets may be soldered in place, or any combination of such securing means may be used.

As the tool joint is rotated with the drill pipe in use, the pellets prevent the tool joint from wearing down more than a small amount below the level of the outer ends of the pellets. The ends of the pellets act as buffers to keep the rest of the tool joint from contacting the well wall. As the inserts wear off on their ends, the rest of tool joint wears down a corresponding amount so that the slight difference in level between the end of the pellets and the surface of the rest of the tool joint remains fairly constant. This distance is the same order of magnitude as the initial maximum protrusion "p" of the inserts beyond their sockets. It is apparent therefore that the inserts may be said to be susbtantially flush with the tool joint surface.

The dashed line x—x indicates the depth to which the tool joint may wear down before it becomes desirable to replace same. It will be noted that even when worn down to this level the depth-width ratio of the pellet sockets is greater than unity so that the pellets are securely retained.

In the preferred embodiment shown in FIGURE 1, the tip or outer end of each pellet is flat. Another preferred embodiment is shown in FIGURES 2 through 4 in which the tip or outer end of each pellet is hemispherical with a radius equal to that of the cylindrical base of the pellet. As shown in FIGURE 2, if such a pellet 50 is inserted in a hole 51 in the tool joint 52 to such a depth that a part of the hemispherical portion is below the outer surface of the tool joint at the mouth of the hole, an annular space 53 is formed between the tip of the pellet and the wall of the hole. This will automatically be true if the pellet has the preferred proportions of w, d, and p as in the embodiment of FIGURE 1. The tool joint material 54 adjacent this space can be worked into space 53, e.g., with a punch, to positively retain the pellet as shown in FIGURES 3 and 4. The effect of such working extends all the way down the side of the socket causing the socket to grip the pellet even after the outer portion of the tool joint at the mouth 54 of the socket has worn away. The result is a stressed fit superior to even the interference type of stressed fit used in the FIGURE 1 embodiment.

While preferred embodiments of the invention have been shown and described, it is obvious that many modifications thereof can be made by one skilled in the art without departing from the spirit of the invention, and it is intended to cover by Letters Patent all forms of the invention falling within the scope of the following claims.

I claim:

1. A tool joint member comprising a steel tubular member having a threaded portion at one end adapted for connection with another correlative tool joint member and at the other end adapted for connection with a drill pipe, said tubular member having a thick walled body portion between said ends, said thick walled portion having the largest outer diameter of said member, said body portion having a plurality of staggered annular rings of spaced apart deep sockets therein, said sockets being disposed with their axes of depth perpendicular to the pipe axis, the cross-sections of said sockets being circular, the depths of said sockets being of the order of fifty percent greater than the widths of said sockets, the spacing between the outer peripheries of said sockets being greater than the depths of said sockets, the depths of said sockets being of the order of fifty percent of the thickness of said body, each of said sockets having a circular cross-section separately preformed tungesten carbide pellet bottomed therein and secured therein, said sockets and pellets being of uniform cross-section from adjacent the bottom of each socket to close to the mouth of each socket to facilitate insertion of the pellets into the socket by motion perpendicular to the tool joint axis and to provide maximum area of contact to retain the pellets in the sockets, the extent of protrusion of each pellet beyond the outer periphery of said body portion being no greater than ten percent of the diameter of the pellet, said tool joint being further characterized by the fact that the outer end of each pellet is hemispherical with a radius equal to that of the circular cross-section of said sockets, said hemispherical portion extending in part below the mouth of the socket in which the pellet is received, said mouth of the socket being worked over against said hemispherical portion to positively retain the pellet in its socket.

2. A tool joint member comprising a tubular body having
   a threaded portion at one end adapted for connection with another correlative tool joint member and
   a portion at the other end of the body adapted for connection with a drill pipe and
   a thickest portion intermediate between the end portions provided on its outer periphery with a plurality of staggered annular rings of spaced apart sockets of depth of the order of fifty percent greater than their maximum widths disposed with their longitudinal axes perpendicular to the axis of the tool joint, and
   each of said sockets having disposed therein a separately preformed pellet of uniform cross-section from adjacent the bottom of the socket to close to the mouth thereof to facilitate insertion of the pellet into the socket by a motion perpendicular to the tool joint axis and to provide maximum area of contact to retain the pellet in its socket
   the extent of protrusion of each pellet beyond the outer periphery of said intermediate portion being between zero and ten percent of the diameter of the pellet,
   said tool joint being further characterized by
   said sockets each having a depth of the order of fifty percent of the thickest portion of said tool joint
   the distance between the longitudinal axes of adjacent sockets in each row increasing progressing from the socket bottoms to their mouths
   said sockets having their outer peripheries spaced apart a distance greater than the depths of said sockets,
   said pellets each being a macroscopically homogeneous unitary tungsten carbide mass,
   said body being made of resilient steel stressed throughout the length of each socket adjacent the pellet therein.

References Cited in the file of this patent

UNITED STATES PATENTS

| | | |
|---|---|---|
| 259,255 | Williams | June 6, 1882 |
| 2,049,265 | Kinney | July 28, 1936 |
| 2,200,129 | Whiteford | May 7, 1940 |
| 2,288,124 | Creighton | June 30, 1942 |
| 2,334,350 | Neuhaus | Nov. 16, 1943 |